Sept. 14, 1954     H. F. WEISS ET AL     2,688,833
TRACTOR ATTACHED MOWER OF THE ROTARY CUTTER TYPE
Filed Aug. 28, 1950     4 Sheets-Sheet 1

INVENTORS
H. F. WEISS,
P. W. CARL,
L. E. CARL,
BY Charles L. Sturtevant
ATTORNEY

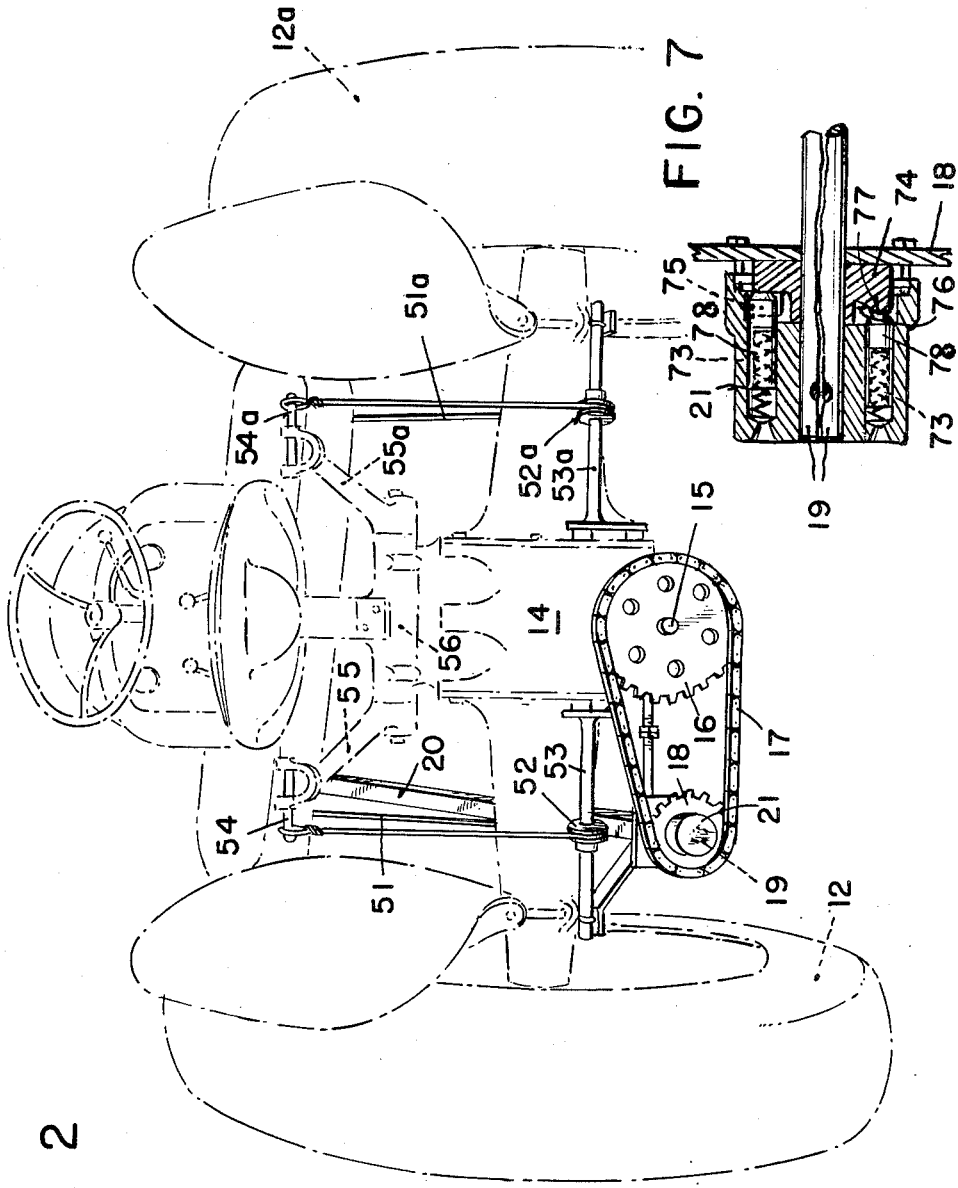

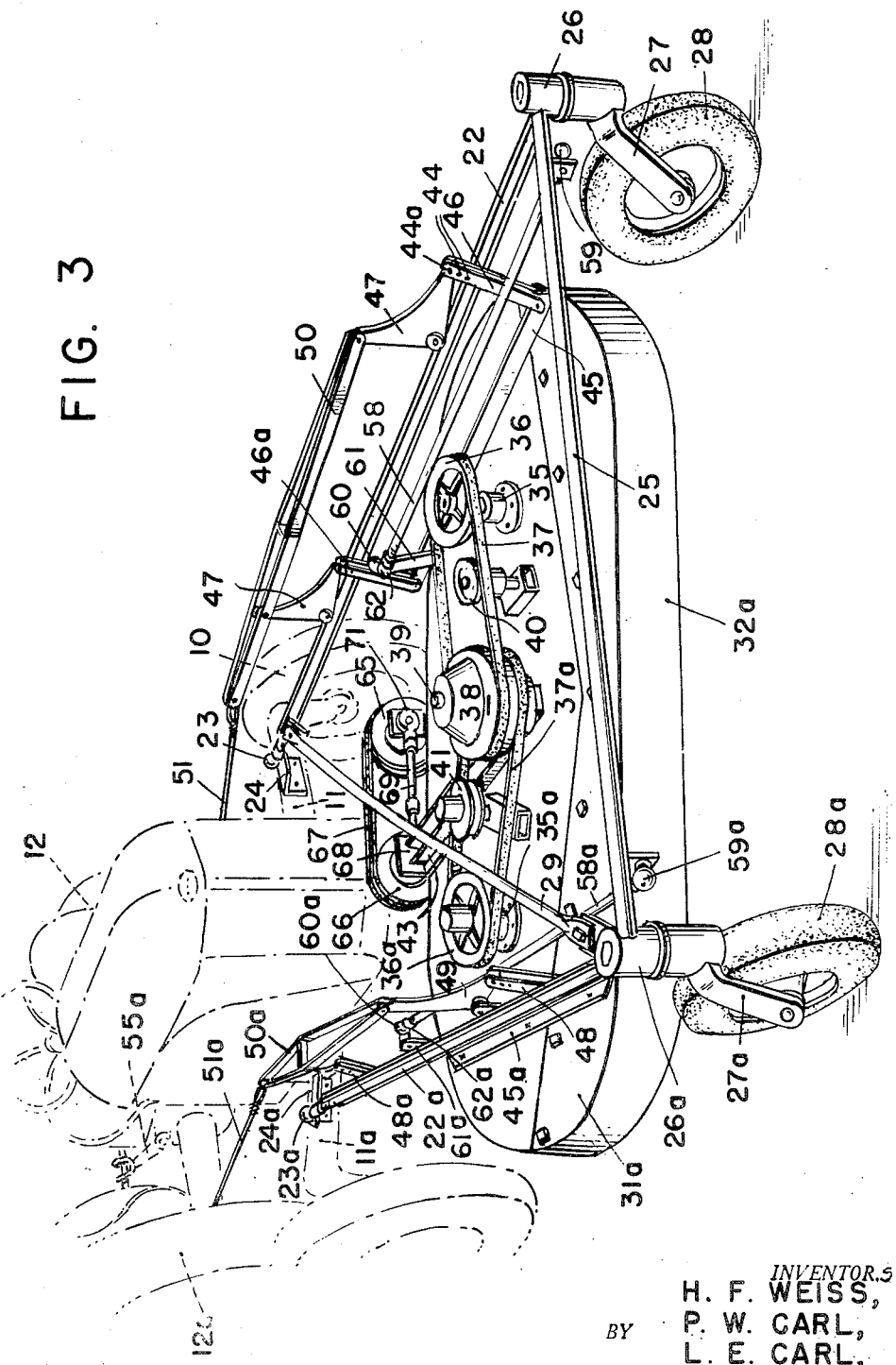

Sept. 14, 1954 H. F. WEISS ET AL 2,688,833
TRACTOR ATTACHED MOWER OF THE ROTARY CUTTER TYPE
Filed Aug. 28, 1950 4 Sheets-Sheet 4
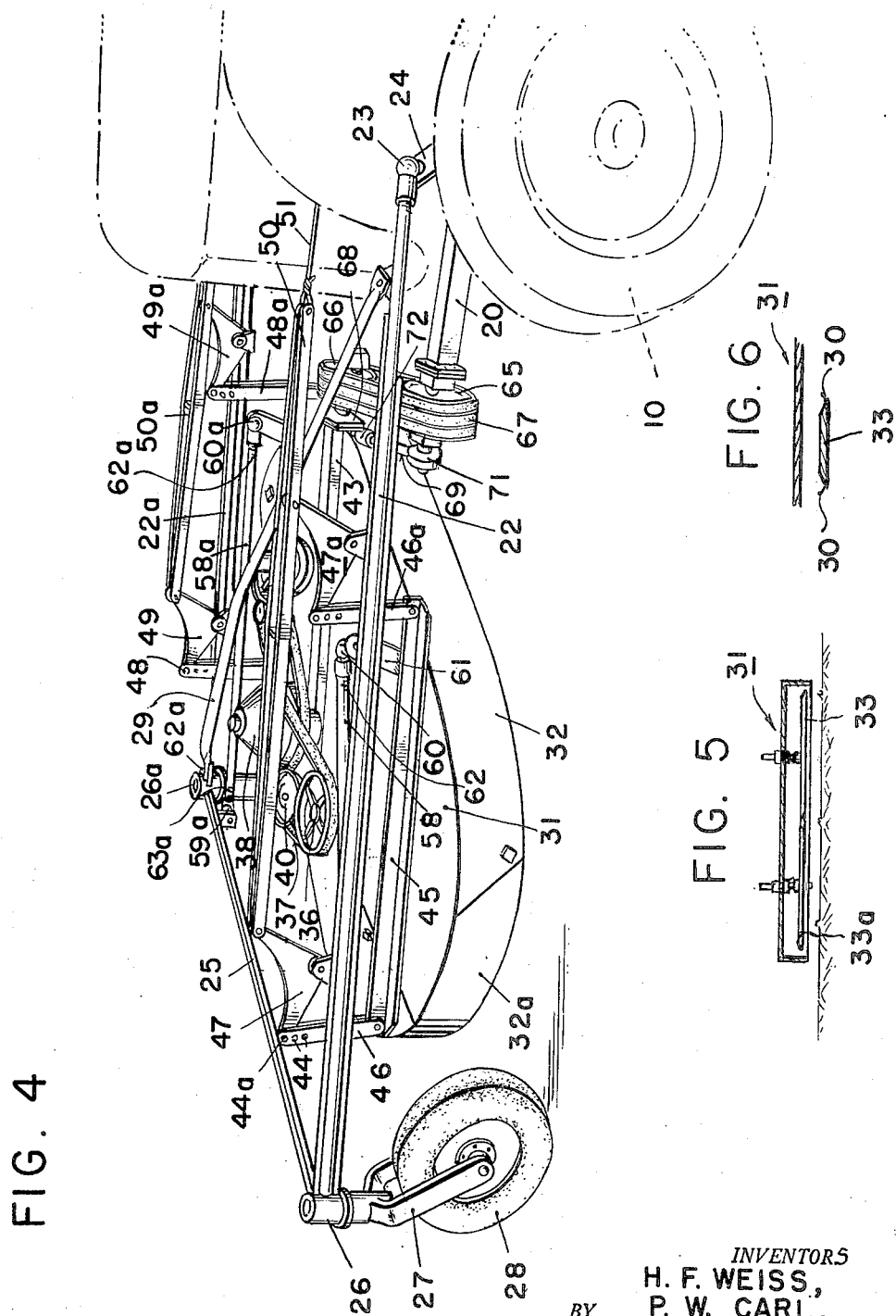
INVENTORS
H. F. WEISS,
P. W. CARL,
L. E. CARL,
BY
Charles L. Sturtevant
attorney Patented Sept. 14, 1954

2,688,833

UNITED STATES PATENT OFFICE 2,688,833

TRACTOR ATTACHED MOWER OF THE ROTARY CUTTER TYPE

Herbert F. Weiss, Paul W. Carl, and Lawrence E. Carl, Miami, Fla., assignors to Agrenco Engineering & Mfg. Company, Hialeah, Fla.

Application August 28, 1950, Serial No. 181,856

16 Claims. (Cl. 56—25.4)

The present invention relates to new and useful improvements in a mower or similar cutting mechanism, and more particularly to such improvements in a rotary cutting mechanism adapted for attachment to and propulsion by a tractor or similar propelling vehicle.

In general, the invention contemplates the provision of a mower or similar cutting mechanism of the type which includes rotating cutting knives, usually two in number, which rotate at a very high speeds in a substantially horizontal plane, the inclination of which may, however, be slightly varied as desired. Preferably, the cutters are disposed on substantially vertical axes which are slightly offset with respect to each other in the forward direction of travel and which are otherwise disposed so that the path of movement of the ends of the blades overlap in the "bight" therebetween. Such a cutting mechanism, with its rotating "velocity" cutters, includes a supporting frame arrangement preferably adapted for attachment to the front end of the tractor or other propelling vehicle so as to lead the same in the cutting operation, although the cutting mechanism may be mounted underneath the tractor in certain instances as will be hereinafter pointed out.

A cutting mechanism of the above type lends itself to the cutting of various types of growth and to heights thereof which vary over a wide range. Thus, the present cutting mechanism is eminently well adapted for the cutting of golf course fairways and rough, as well as grass along parkways, highways, estates and the like. As a further example of the wide range of useful applications to which the present cutter assembly may be applied, it is well adapted for the cutting of weeds, light brush and heavier growth, as well as for cutting down all sorts of cover crops and the chopping thereof into more or less of a compost adapted to be subsequently plowed under for soil conservation and fertilizer.

With the above in mind, one of the principal objects of the present invention is to provide a cutter assembly which is constructed and arranged to permit ground supporting rollers or wheels to independently and closely follow ground contour with resultant tilting of the adjacent parts of the frame to prevent the cutters from digging into the ground and to maintain an even cut.

Another object of the invention is to provide a cutter assembly adapted for attachment to a tractor or like propelling vehicle and including main and sub-frame assemblies capable of relative adjustment and limited floating therebetween to lend substantial flexibility to the machine.

A further object of the invention is to provide a cutter assembly substantially of the above type having an improved drive connection between the power take-off and the cutter drive such as to permit the relative movement between the frame assemblies without affecting the cutter drive connection.

A still further object of the invention is to permit over-running of the high velocity cutting mechanism under built-up inertia after disconnecting the power take-off in order to stop the tractor at will and as desired.

A still further object of the invention is to permit relative adjustment of the frame assemblies by means readily accessible to the operator and without interrupting operation of the machine.

The invention also aims to provide a housing for the cutter members operating to forwardly deflect high growth to be cut and to provide a chamber within which comminution of the cut material may be effected.

Also, the invention contemplates the provision of a cutter mechanism substantially of the above general type having a high degree of maneuverability in that the leading ground engaging elements automatically follow the tractor steering and wherein there is always maintained clear visibility with high flexibility of the machine in following ground undulations.

The invention still further aims to provide a cutter assembly substantially of the above type which is of strong and sturdy construction, which is easily operated and manipulated and which is highly efficient in operation over a wide range of operating conditions.

The above and other objects of the invention will in part be obvious and will be hereinafter more fully pointed out.

Figure 2 is an enlarged rear view of Figure 1;

Figure 3 is an enlarged front perspective view of the assembly;

Figure 4 is a further perspective view looking forwardly across the assembly;

Figure 5 is a reduced detail section showing the position of the cutter blades within and above the edge of the housing skirt;

Figure 6 is an enlarged fragmentary and diagrammatic section showing the beveled edges of the blades housing top, and Figure 7 is a small diagrammatic section illustrating the action of the clutch parts in driving and over-running positions at the upper and lower parts, respectively.

Figure 1:
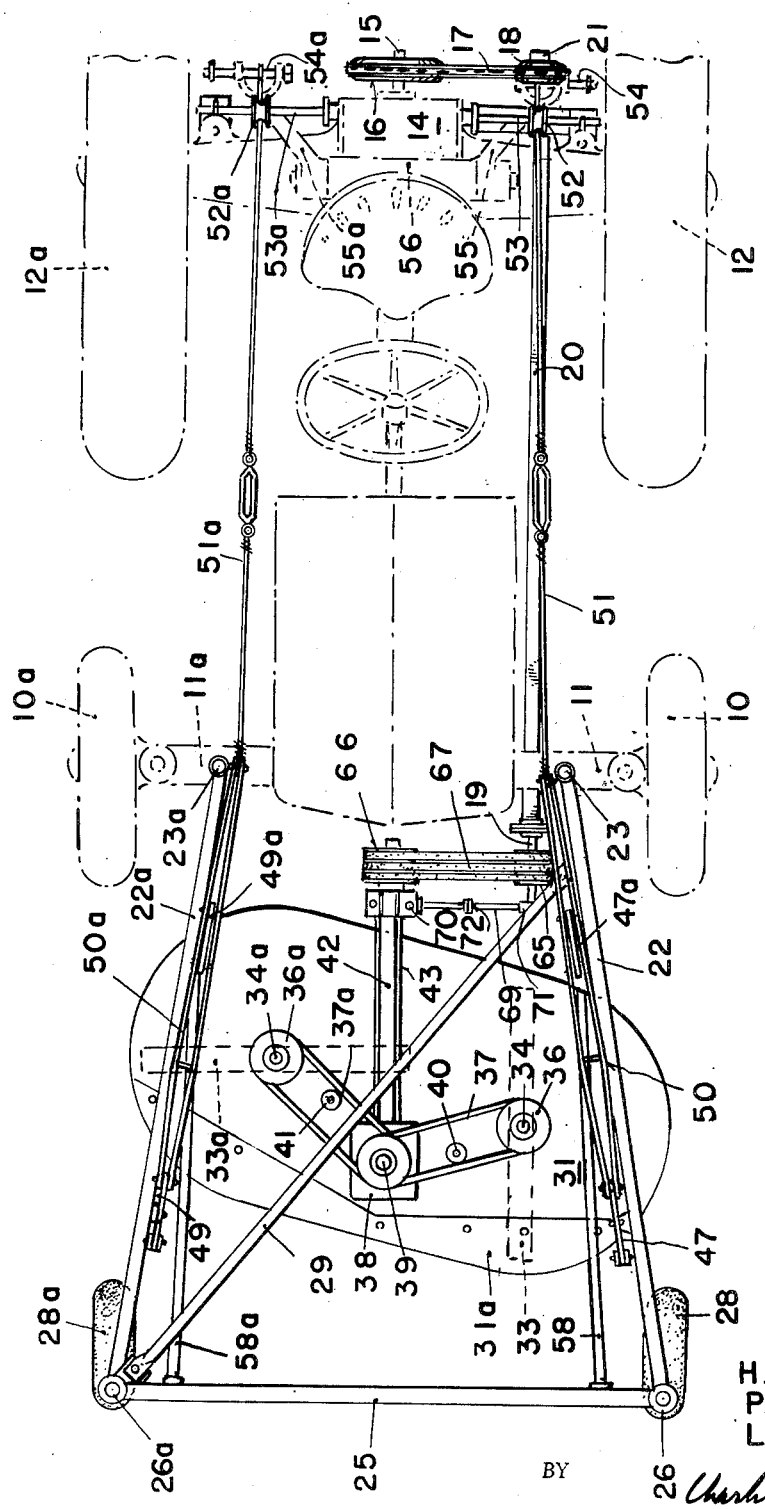
Figure 1 is a top plan view of the cutter assembly with the tractor shown in dotted lines.

Referring more in detail to the accompanying drawings, and particularly at this time to Figures 1 and 2, there is shown a conventional type of tractor as the propelling unit for the cutter mechanism which is mounted at the front end thereof, and which is thus adapted to be pushed by the tractor or other suitable type of propelling mechanism in the cutting operations. As illustrated, the tractor includes front steering wheels 10, 10a mounted on transversely extending wheel and king pin supports 11, 11a, respectively and rear driving wheels 12, 12a which are driven from a transmission within a transmission housing 14. There is provided a rearwardly extending power take-off shaft 15 driven in conventional manner and carrying a sprocket wheel 16 over which is trained a driving chain 17. This chain 17 is also trained over a smaller driven sprocket wheel 18 which is carried at the rear end of a shaft 19. An over-running ratchet type clutch or similar type may be incorporated in the driven sprocket, if desired. The inertia of the whirling masses of the pulleys, blades and other parts of the cutting mechanism, have a tendency to roll the tractor and unit in the direction it is traveling, even after the tractor engine clutch is disengaged, and thus making it impossible to stop the unit with the tractor brakes within a reasonable distance since disengaging the tractor engine clutch still leaves this built-up inertia free to propel the whole unit back through the tractor power take-off shaft, unless these masses are allowed to free-wheel through the medium of the over-running ratchet type clutch. Such an over-running ratchet type clutch within housing 21 is built onto the rear end of shaft 19 and incorporates the driven sprocket 18 to make it possible for the power take-off shaft of the tractor to drive the cutting mechanism but to make it impossible for the inertia forces of the rotating masses of weight to propel the tractor. The shaft 19 is mounted in a housing 20 suitably secured to the tractor frame along the length thereof so that the shaft projects forwardly of the tractor in advance of the transverse wheel support 11, as particularly shown in Figure 1. Thus, the shaft 19 is driven by the power take-off shaft 15 and constitutes the driving shaft for the cutting mechanism in the manner to be pointed out hereinafter.

Now referring also to Figures 3 and 4 of the accompanying drawings, the cutter mechanism will be described. In general, the cutter mechanism is supported on a floating sub-frame which, in turn, is carried by a main frame supported by ground engaging elements, such as wheels or the like. The sub-frame is adjustable with respect to the main supporting frame in the manner to be presently described so that the cutter mechanism can be adjusted as to height of cut by means immediately accessible to the tractor operator.

More specifically concerning the main frame, there are provided two bars 22, 22a extending forwardly from the tractor and having the rear ends thereof connected to the tractor by ball and socket joints 23, 23a carried by brackets 24, 24a which may be secured to the transverse wheel supports 11, 11a, respectively. The front or leading ends of the bars 22, 22a are joined by a transverse bar 25 carrying substantially vertically disposed bushings 26, 26a for receiving the pivot shafts of yokes 27, 27a in which ground engaging wheels 28, 28a, respectively, are carried to thus support the front of the main frame in advance of the tractor. There is also provided at least one diagonal bar 29 extending from the front end of the frame bar 22a to a point adjacent the rear end of the bar 22 for stabilizing the main frame relative to lateral motion of the tractor. It will be appreciated that the front of the main frame is supported on the leading ground engaging or caster wheels 28, 28a and the rear of this frame, being connected to the front end of the tractor, is supported on the tractor steering wheels 10, 10a. By reason of the ball and socket connections 23, 23a between this frame and the tractor, and relative play between the frame bars, each wheel may follow ground undulations and thus provide a very flexible carrier for the cutter mechanism.

The sub-frame constitutes the direct support for the cutter mechanism and includes a downwardly opening casing having a substantially horizontally disposed top platform 31 and a depending peripheral skirt portion 32. If desired, the front portion 31a of the platform and the skirt portion 32a co-extensive therewith may constitute a separately attached portion which may be removed for certain types of cutting or for repair and cleaning of the blades. As previously indicated, the cutting mechanism consists of a pair of horizontally rotating blades 33, 33a carried by vertical stub shafts 34, 34a, respectively, and mounted in bearings 35, 35a on the platform 31. The upper ends of the stub shafts 34, 34a carry grooved pulleys 36, 36a for the reception of operating belts 37, 37a, these belts being trained around spaced friction grooves on a central pulley 38 carried by a stub shaft 39 suitably mounted on the platform 31. Idler pulleys 40, 41 may be suitably mounted on the platform 31 for horizontal adjustment to take up slack in the belts 37, 37a, respectively. The stub shaft 39 is suitably connected, as by a gear and pinion connection, to a centrally disposed shaft 42 extending centrally and rearwardly of the platform 31 within a protective casing or channel 43 which is mounted on the platform. It is through this shaft 42 that the rotating blades are driven by connection with the forwardly extending power take-off shaft 19 as will be pointed out hereinafter.

The sub-frame assembly is supported from the main frame assembly for various adjustments relative thereto. At the sides of the platform, there are provided vertical flange members 45, 45a disposed below and substantially parallel to the side frame bars 22, 22a. Spaced pairs of arms 46, 46a are pivotally connected to the front and rear ends of the flange member 45 and to one arm of similarly spaced bell crank levers 47, 47a which are pivoted on the frame bar 22. Similar pairs of arms 48, 48a are pivotally connected to the ends of the flange member 45a and to one arm of similarly spaced bell crank levers 49, 49a pivoted to the frame bar 22a. The other arm of each bell crank lever extends upwardly from the main frame and those along the frame bar 22 are pivotally connected to an elongated operating link 50 while those along the frame bar 22a are pivotally connected to a similar operating link 50a. The pairs of connecting arms constitute, with the respective bell crank levers, a suspension linkage system for the sub-frame and if desired, the arms may be replaced by chain links for greater flexibility. While a four point suspension for the sub-frame is thus provided, greater flexibility might be accomplished by substituting a single bell crank lever and suspension link at the center of gravity of one side of the frame to provide a three point suspension in which case one of the operating links 50, 50a would be eliminated and the corresponding cable connected directly to the single bell crank lever. Each of the arms 46, 46a, 48, 48a is provided with vertically spaced drilled holes 44 along the upper ends thereof for receiving corresponding pivot pins 44a. By selectively changing the holes through which the connecting pivot pins extend, the entire angle of relative inclination or pitch of the sub-frame may be effected, as well as the height of the sub-frame.

As more clearly shown in Figures 1 and 3, the rear ends of the operating links 50, 50a are connected to flexible cables 51, 51a, respectively, which, as shown in Figures 1 and 2, extend rearwardly along the tractor to pulleys 52, 52a which are mounted on transverse stub shafts 53, 53a suitably mounted on brackets at the rear end of the tractor. These cables extend beneath the pulleys and upwardly to mounting pins 54, 54a which are carried respectively by swingable or oscillatable arms 55, 55a. These arms 55, 55a may be selectively swung to move the links 50, 50a in either forward or rearward direction by control of a hydraulic operating mechanism of known type and generally indicated by the numeral 56. Selective manual control of the hydraulic mechanism is immediately accessible to the tractor operator from the operator's seat so that adjustment of the height of the cutter supporting sub-frame can be readily accomplished without leaving the driver's seat and without stopping the tractor. When the arms 55, 55a are permitted to swing downwardly, the weight of the sub-frame will effect lowering thereof with forward movement of the bell crank levers about their respective pivots. When the arms 55, 55a are power swung upwardly, the cables and the operating links 50, 50a will shift rearwardly with resultant rearward movement of the bell crank levers and elevation of the entire cutter supporting sub-frame assembly.

In addition to the bell crank support for the sub-frame assembly, there are provided stay bars 58, 58a pivotally connected by ball and socket joints 59, 59a at the forward ends thereof to the transverse frame bar 29 and at the rear ends thereof by ball and socket joints 60, 60a to arms 61, 61a upstanding from adjacent the rear ends of the flange members 45, 45a. Thus, these stay bars are connected at the forward ends thereof to the main frame and at the rear ends thereof to the cutter frame. The connections 62, 62a at the rear ends of the stay bars are right hand thread connections while the connections 63, 63a at the front ends thereof are left hand thread connections so that each bar with its end connections may function as a turnbuckle for alignment of the cutter drive transfer mechanism to be described below and of course lock nuts are provided thereon.

The transfer drive connection between the driven power take-off shaft 19 and the shaft 42 is such as to permit the adjustment of the subframe relative to the main or carrier frame without affecting the drive connection. The forward end of the shaft 19 carries a multiple-groove pulley 65 and the rear end of the shaft 42 carries a similar multiple-groove pulley 66. Belts 67 are trained over these pulleys to effect rotation of the shaft 42 from the driven power take-off shaft 19, and the resultant rotation of the cutting blades through the pulley and belt connections mounted on the sub-frame and previously described. The pulleys 65, 66 are maintained in their proper relative positions of substantially planar disposition as well as belt tensioning position regardless of adjustment between the main and cutter frame assemblies and permissive relative vibration and shifting therebetween during operation of the machine. In order to maintain uniform distance between the pulleys 65, 66 during operation of the machine, and regardless of relative shifting between the main and cutter frame assemblies, there is provided a link connection between the shafts 19, 42. A bracket 68 is secured to the casing 43 for the shaft 42 and a link 69 has one end thereof secured by a pivot connection 70, such as a ball and socket connection, to that bracket. The opposite end of the link 69 is secured by a ball bearing yoke connection 71 to the free end of the driven power take-off shaft 19. The link 69 is a two-part link connected, as at 72, by a threaded coupling to permit variation in its lengthwise extent, as desired. Thus, with a predetermined setting of the length of the link 69, the distance between the pulleys 65, 66 is maintained constant regardless of relative movement of the cutter supporting frame with respect to the main frame and the tractor which relative movement would ordinarily affect the positioning of the shafts 19, 42. However, by the link 69, the shafts 19, 42 are maintained in laterally spaced position consistent with proper tensioning of the connecting belts 67 therebetween.

With further regard to the link 69, it operates in the manner of a lateral stay-bar to lend lateral stability to the sub-frame assembly since the driven power take-off shaft 19 is relatively fixed. The adjustable turnbuckle connection 72 permits adjustment of the length of the bar 69 with resultant permissive adjustment of the tension of the pulley belts 67 as desired; as well as maintaining a predetermined set adjustment of the belt tension during operation of the machine regardless of relative shifting of the cutter frame during adjustment for height of cut and during operation over uneven ground. Initial alignment of the pulleys 65, 66 for the belts, preferably V-belts, may be accomplished by manipulation of the right and left hand thread connections at the ends of the stay rods 58, 58a in understood manner, there being sufficient permissive fore and aft play for this purpose.

It is believed that operation and manipulation of the mowing machine will be more or less apparent from the foregoing description but briefly, connecting the take-off shaft 15 with the motor will effect rotation of the transfer shaft 19 and the cutter operating shaft 42 through the belts 67 and pulleys 65, 66. The shaft 42 will rotate the center pulley 38 on the cutter frame and from this pulley, the blade pulleys 36, 36a will be rotated by the belts 37, 37a in the same angular direction so as to reduce excessive loading which would result from counter rotating blades. Preferably the blades 33 lead the blades 33a with respect to the forward direction of travel and the blades rotate in a counter clockwise direction so that the relative staggered positions of the blades provide the illustrated lead and throw to the left of the machine as viewed from the driver's seat.

As previously indicated, the cutting blades rotate at relatively high speeds of the order of 1800

R. P. M. and are in the nature of "velocity" cutters relying to a large extent on the speed of rotation for the effective cutting action thereof. However, within the chamber provided by the platform 31 and its depending skirt, the high speed cutting blades create a high turbulence of the material being cut. The blades closely follow the inner surface of the skirt at adjacent points so as to assist in fine division and scattering of the cut material. The upper edges of the cutting blades are beveled to incline upwardly from the cutting edges thereof, as shown at 30 in Figure 6. This upward bevel serves to drive the cut material upwardly against the top of the housing by which the material is, in turn, directed downwardly into the paths of the high velocity cutting blades. Additionally, rotary movement is imparted to the cut material within the housing as well as an upward drawing or suction on the material and these several factors combine to effect high turbulence and repeated re-cutting of the material confined within the housing by the skirt so as to effect fine chopping of the material. In the cutting of relatively heavy growth of large diameter, the front part of the housing 31a, 32a may be removed so that the cutting blades come in direct contact with the material being pushed forwardly by the frame bar 25 at the predetermined height to which the sub-frame and cutters have been set. The front frame bar 25 acts to push forward heavy growth to an "angle of attack" facilitating easy and rapid cutting thereof. The leading left blade 33, rotating counter-clockwise, clears a path for the load thrown in that direction by the right blade 33a. With relatively heavy growth, it is sometimes desirable to go over the original cutting path a second time, particularly where it is desired to leave a mulch, and in so doing, the heavier pieces of cut material which are not ground up during the first cutting will be drawn up within the housing and chopped to a mulch in the second cutting. The result is a relatively fine cutting or comminution of the material which is particularly of advantage in cutting heavier growth and cover crops in that the remaining finely divided material forms more or less of a compost which inherently assists the treatment of the ground over which the machine is operated.

Further with respect to the over-running clutch, reference being had to Figure 7, the housing 21 is secured to the shaft 19 for rotation therewith and carries plungers 78 which are urged by springs 73 forwardly parallel to the shaft axis. The sprocket 18 is loose for relative rotation with respect to the shaft 19 and carries on the rear face thereof a disk 74 which has spaced dogs or ratchet surfaces around the rear face thereof. Each dog presents a driving abutment 75 at one end thereof and an oppositely disposed inclined camming surface 76 with a flat top 77 at the other end thereof. When the power take-off shaft 15 is connected for driving the shaft 19 and the cutters, the sprocket 18 and disk 74 will be rotated so that the plungers 78 will be spring urged into the path of the driving abutments 75 (see Figure 7) thus rotating the housing 21 and resultantly the shaft 19 in proper angular direction for rotating the cutting blades. It is often difficult or impossible to disengage the power take-off clutch until the rotating blades slow down with result that when the tractor engine clutch is disengaged and the tractor brakes applied for stopping the same, with the engine R. P. M. reduced, the shaft 19 and housing 21 continue to rotate faster than the sprocket 18 and its connected disk 74 and would tend to "walk" the tractor. However, when this occurs, the plungers 78 are forced inwardly by riding up the inclined surfaces 76 and over the flat surfaces 77, thus making it impossible for the shaft 19 and housing 21 to drive the disk 74 and sprocket 18 under the influence of the stored inertia of the rapidly revolving cutters. In other words, during this over-running action, the plungers 78 will be rapidly forced inwardly by the camming surfaces and then outwardly by the springs 73 as the shaft 19 and housing 21 rotate until the inertia forces of the cutter mechanism are spent and the cutters come to rest.

By reason of the transfer drive connection between the shafts 19 and 42, that is the stay bar connection, relative movement of the cutter sub-frame and the main frame or tractor, particularly when operating over uneven ground or on highly tough and resistant growth, does not affect the drive connection since the belt tension is maintained. Likewise, adjustment of the height of the cutter frame can be accomplished without disturbing this drive connection. The leading wheels 28, 28a immediately respond to the turning of the tractor wheels 10, 10a to facilitate maneuvering of the machine and these four wheels provide a four point support for the cutter assembly with each wheel independently following ground undulations and contour by reason of the inherent relative flexibility of the parts of the cutter assembly. Necessarily, this results in an even cutting over rough ground as well as a safeguard to prevent the cutter blades and housing from digging into the ground.

It will be apparent from the foregoing description that the present invention provides a highly efficient mowing machine adapted for high speed operation over a wide variety of terrain and growth to be cut. It is strong and durable by reason of the permissive flexibility between the main and sub-frame, as well as the flexible drive connection between the cutter and power shafts. The simplicity of attachment and detachment of the cutter assembly to and from the tractor vehicle at the two ball joints 23, 23a is apparent. While attachment of the cutter mechanism to the front of the tractor has been illustrated, it is to be understood that in some instances, as with a high clearance tractor or other propelling vehicle, the cutting mechanism may be mounted beneath the tractor body and between the front and rear wheels thereof. In such an installation, the frame bars 22, 22a may be connected by similar ball and socket joints to the rear of the tractor frame or to the rear axle housing. Also, the front ends of the frame bars 22, 22a may then be connected by ball and socket joints to the front wheel supporting arms 11, 11a, if desired, and this will eliminate the front caster wheels 28, 28a so that the front wheels of the tractor will act in place thereof. Thus, the same amount of flexibility will be afforded with the same ease of following ground undulations in such an installation.

While one form of the invention has been shown and described for purposes of illustration, it is to be clearly understood that various changes in the details of construction and operation and arrangement of parts may be accomplished without departing from the spirit of the invention and scope thereof as set forth in the appended claims.

We claim:

1. A mowing mechanism adapted for attachment to a tractor or like propelling vehicle, and comprising frame means including supporting ground engaging elements, a supporting platform carried by said frame means and including a depending peripheral skirt, substantially horizontal cutting blades operating within said skirt with the axis of one cutting blade offset slightly in advance of the other and with both blades rotating in a counter-clockwise direction and in lapping relation, blade driving pulleys mounted on said platform and means including a drive shaft on said platform for imparting rotation to said pulleys.

2. A mowing machine and cutting assembly comprising a tractor having a power take-off, a main frame including forwardly extending frame bars having tractor attaching means at the rear ends thereof pivotally connected to the tractor, an auxiliary sub-frame underlying the main frame and carrying a cutter mechanism, suspension means depending from said frame bars and connected to said auxiliary frame for supporting the same from said main frame and independently of the tractor, and leading ground engaging wheels supporting the front ends of said frame bars.

3. In a mowing machine as claimed in claim 2, wherein the sub-frame carries a cutter drive shaft disposed parallel to the power take-off and means movable with the sub-frame for connecting the drive shaft with the power take-off, and maintaining constant spacing of such connection.

4. In a mowing machine as claimed in claim 3, wherein the connecting means between the power take-off and cutter drive shaft includes a lateral stay bar operable to maintain a predetermined relative distance therebetween during permissive relative movement of the sub-frame relative to the power take-off.

5. In a mowing machine as claimed in claim 4, wherein the connecting means includes a pulley and belt drive and the stay bar is pivoted to said sub-frame and to the free end of the power take-off shaft whereby to maintain the belt drive under predetermined driving tension.

6. In a mowing machine including a tractor or like propelling vehicle having a power take-off shaft, the provision of relatively adjustable and substantially juxtaposed main and sub-frame assemblies, means for attaching the main frame assembly at the forward end of the vehicle, cutter means depending from said sub-frame, means suspending said sub-frame below said main frame and including shiftable levers carried by the main frame and depending links connecting the same to said sub-frame, control arms disposed adjacent the tractor drive seat under selective control of the operator and flexible cable means connecting said control arms and said levers whereby to control the relative adjustment of said sub-frame relative to said main frame.

7. In a mowing machine including a tractor or like propelling vehicle having a power take-off, the provision of high velocity cutter mechanism connected to the propelling vehicle, means for driving the cutter mechanism from the power take-off, and means included in the driving means and operative to permit over-running of the high speed cutter mechanism when the power take-off is disengaged whereby to permit immediate stopping of the machine.

8. In a mowing machine as claimed in claim 7, wherein the cutter driving means includes connecting shafts on the tractor with one shaft having incorporated therein means permitting over-running of the cutter mechanism when the power take-off is disengaged.

9. In a mowing machine as claimed in claim 7, wherein a transfer shaft between the power take-off and the cutter mechanism includes an over-running clutch permitting free running of the cutter mechanism when the power take-off is disengaged.

10. A mowing mechanism adapted for attachment to a tractor or like propelling vehicle, and comprising a main frame including longitudinally extending side bars and ground engaging wheels adjacent the front ends thereof, a sub-frame including a downwardly open housing with the upper surface thereof providing a platform substantially coextensive with the main frame, spaced bell crank levers pivotally mounted on said side bars, means extending longitudinally of said side bars and interconnecting the upstanding arms of said bell crank levers for rotating the same, links depending from the other arms of said bell crank levers, means connecting the lower ends of said links to said housing whereby rotation of the bell crank levers will effect relative shifting of the housing with respect to the main frame, high speed substantially horizontally disposed cutter blades mounted within said housing, drive means for said cutter blades mounted on the platform surface of said housing, and longitudinally extending stabilizer bars adjacent each side bar, each of said stabilizer bars being connected at its forward end to the main frame and at its rearward end to said housing by pivotal connections permitting slight relative twisting between the main frame and the sub-frame whereby to resist breakage and undue strain resulting from high speed reaction of the ground engaging wheels to ground undulations.

11. A mowing mechanism adapted for attachment to a tractor or other propelling vehicle, and comprising substantially laterally coextensive main and sub-frame assemblies disposed in different planes, tractor attaching means carried at one end of the main frame assembly, ground engaging wheels associated with the main frame assembly, cutter means and cutter driven means carried by the sub-frame assembly, and means interconnecting the main and sub-frame assemblies with the sub-frame assembly suspended below the main frame assembly for permissive relative movement therebetween to compensate for comparable movement of the ground engaging wheels following ground undulations.

12. A mowing mechanism as claimed in claim 11, wherein the connections between the main and sub-frame assemblies include vertical link means in fore and aft spaced relation suspending the sub-frame assembly from the main frame assembly and means for shifting said link means to effect relative vertical adjustment between said frame assemblies.

13. A mowing mechanism as claimed in claim 12, wherein the shifting means for the link means includes bell crank levers pivoted to the main frame assembly and connected to said link means.

14. A mowing mechanism as claimed in claim 13, wherein the bell crank levers are spaced fore and aft along at least one side of the main frame assembly and connected by an operating arm extending longitudinally of the main frame assembly.

15. A mowing mechanism as claimed in claim 11, wherein the sub-frame assembly includes spaced longitudinal stay bars having adjustable pivotal connections at the front ends with said main frame assembly and at the rear ends with said sub-frame assembly for permitting relative movement between the frame assemblies in response to tilting movement of the ground engaging wheels following ground undulations.

16. A mowing mechanism as claimed in claim 11, wherein the cutting means is substantially enclosed in a downwardly opening casing forming a part of the sub-frame assembly and within which the cutting action is accomplished.

References Cited in the file of this patent

UNITED STATES PATENTS

| Number | Name | Date |
|---|---|---|
| 1,462,486 | Devey | July 24, 1923 |
| 1,880,154 | Rotondo | Sept. 27, 1932 |
| 1,894,740 | Groenig et al. | Jan. 17, 1933 |
| 2,017,524 | Bolens | Oct. 15, 1935 |
| 2,134,115 | Flammang | Oct. 25, 1938 |
| 2,229,363 | Bishop | Jan. 21, 1941 |
| 2,243,133 | Steiner | May 27, 1941 |
| 2,308,076 | Hainke | Jan. 12, 1943 |
| 2,312,972 | Orr | Mar. 2, 1943 |
| 2,340,919 | Allen | Feb. 8, 1944 |
| 2,433,799 | Walz et al. | Dec. 30, 1947 |
| 2,489,204 | Sprick et al. | Nov. 22, 1949 |
| 2,500,914 | Sells | Mar. 14, 1950 |
| 2,506,054 | Agee et al. | May 2, 1950 |
| 2,510,242 | Minns | June 6, 1950 |
| 2,517,855 | Elliott et al. | Aug. 8, 1950 |
| 2,539,881 | Wilkins | Jan. 30, 1951 |
| 2,547,401 | Loewe | Apr. 3, 1951 |
| 2,653,437 | Crump | Sept. 29, 1953 |

FOREIGN PATENTS

| Number | Country | Date |
|---|---|---|
| 615,095 | Great Britain | Dec. 31, 1948 |

OTHER REFERENCES

Farm Implement News, May 19, 1949, page 46.
Popular Mechanics, May 1950, page 109.